July 2, 1940.  D. W. MANN  2,206,817
PRECISION SPIRIT LEVEL
Filed Jan. 5, 1940  2 Sheets-Sheet 1

INVENTOR.
David W. Mann
BY Spear, Rawlings & Spear.
ATTORNEYS.

July 2, 1940.  D. W. MANN  2,206,817
PRECISION SPIRIT LEVEL
Filed Jan. 5, 1940  2 Sheets-Sheet 2

INVENTOR.
David W. Mann
BY Spear, Rawlings & Spear.
ATTORNEYS.

Patented July 2, 1940

2,206,817

UNITED STATES PATENT OFFICE 2,206,817

PRECISION SPIRIT LEVEL

David W. Mann, Lincoln, Mass., assignor to The L. S. Starrett Company, Athol, Mass., a corporation of Massachusetts Application January 5, 1940, Serial No. 312,551

19 Claims. (Cl. 33—214)

My present invention relates to a precision device for use in testing surfaces where it is of real importance that variations in inclination of different parts of that surface be accurately measured.

These tests have been heretofore effected by levels in which shims were employed to center the bubble of the level on the particular surface to be tested. On movement of the level and its shims to a new position on that surface, if the bubble needed recentering, either a record had to be made of the shims added or removed, or the movement of the bubble in its vial had to be noted to permit the measurement of variations in inclination of other portions of the tested surface.

The use of shims was unsatisfactory and measurement of bubble movement was inadequate because of the difficulty of providing the vial with sufficiently accurate calibrations in view of its internal curvature.

In accordance with my invention I provide a precision instrument to which one end of a vial is pivotally supported and at its free end is under the control of novel manually operated adjusting means by which the vial may be adjusted to center the bubble accurately. My adjusting means includes a fixed nut, a rotatable screw threaded in the nut and frictionally carrying a dial readable with reference to a fixed zero or centering mark. The dial or other indicator thus rotates with the screw, or independent of it so that after the bubble has been centered with my device on one portion of the surface to be tested, the dial may be re-set to give the adjusted position of the vial a zero reading in order that the variations in inclination of other portions of that surface may be quickly and accurately measured relative to the thus established zero reading of the first position of my device.

In the accompanying drawings I have illustrated an embodiment of my invention in connection with which its several novel features and advantages may be more readily appreciated. In the drawings.

Figure 1:
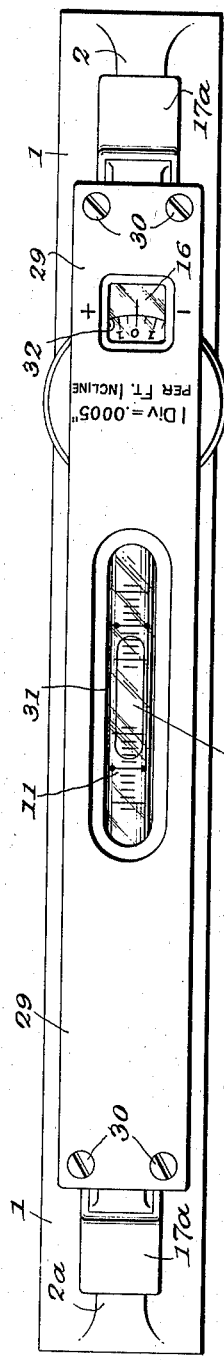
Fig. 1 is a top plan view of a device in accordance with my invention.
Figure 2:
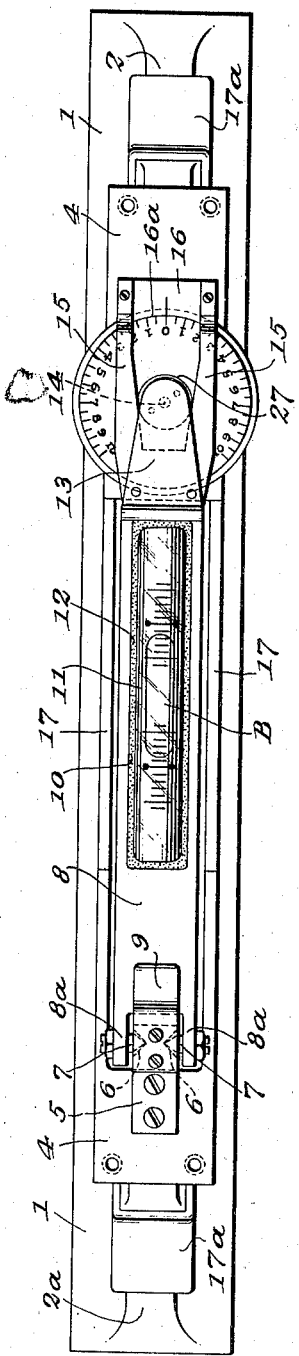
Fig. 2 is a similar view of my device with the cover removed.

In accordance with my invention I employ a frame having a relatively narrow work contacting base I supporting as at 2, 2a and 3 and 3a, the bed 4. Adjacent one end of the bed 4 I attach a block 5 formed with bearings 6 for pivots 7 which extend through the forked ends 8a of the cradle arm 8. A spring 9 carried by the block 5 bears against the cradle arm 8.

The cradle arm 8 is channelled as at 10 to receive the vial 11. Preferably the vial 11 is set in an insulating bed of plaster of paris or like cementitious material, indicated as at 12. The cradle arm 8 includes a flange 13 carrying a bearing 14 and a forked bracket 15 in support of a centering or zero scale 16 having an arcuate edge portion 16a.

Figure 3:
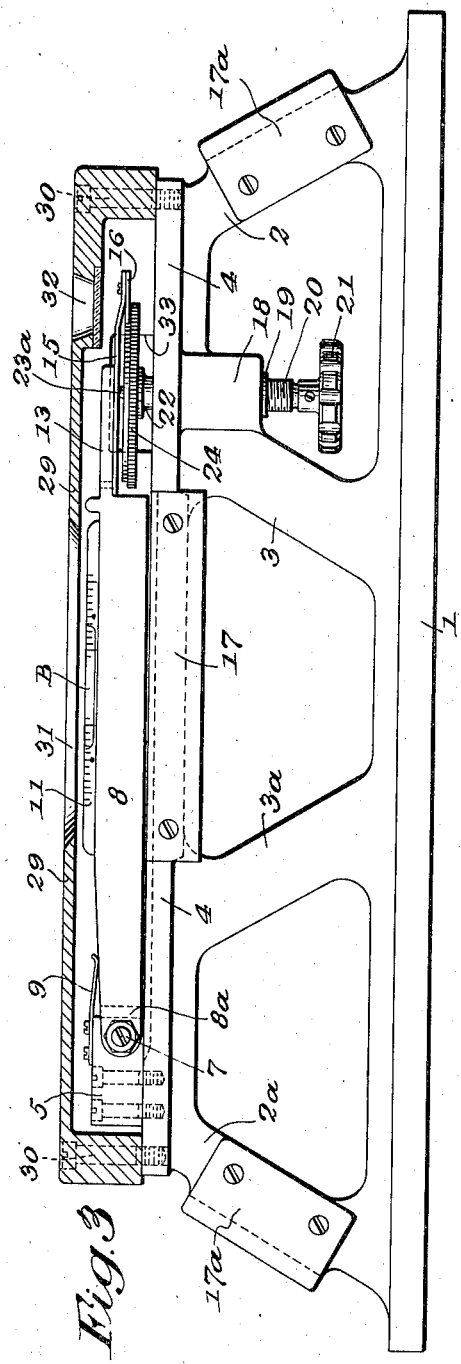
Fig. 3 is a partly sectioned side view of the device in Fig. 1.

As may be most clearly seen in Fig. 3, the bed 4 carries a grip 17 and the supports 3 and 3a are so spaced that they establish a well defined hand grip. Preferably the grip 17 and the grips 17a on the supports 2 and 2a are of insulating material so that the heat of the hand will not affect the accuracy of my device.

Figure 4:
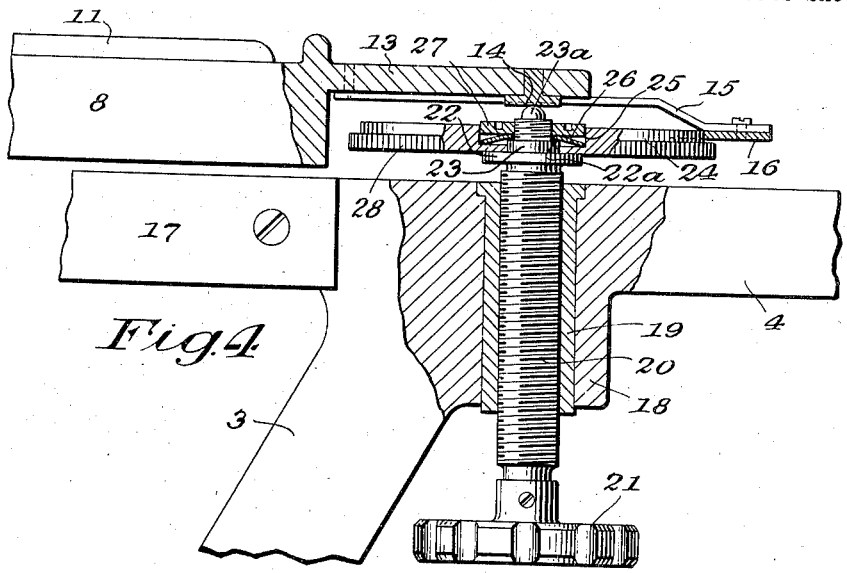
Fig. 4 is an enlarged view partly sectioned to show the details of construction of the adjusting and dial supporting means.

The support 3 as is shown most clearly in Fig. 4 is formed with a boss 18. The boss 18 and the bed 4 are apertured to support a flanged sleeve 19 internally threaded to receive the screw 20 rotatable manually by the knob 21. It will be noted that the supports 2 and 3 are so formed and disposed that they do not interfere with the manual rotation of the knob 21.

The screw 20 is provided at its upper end with shoulders 22 and 22a and is threaded as at 23. The screw 20 carries a spindle 23a for contact with the bearing 14. A dial 24 fits over the screw 20 and is supported by the shoulder 22.

The dial 24 is recessed as at 25 to receive the spring 26 compressed by the nut 27, adjustable on the threads 23 to compress the spring 26 into contact with the shoulder 22a to cause the dial 24 to be locked frictionally to the screw 20. The dial 24 has a knurled flange 28 and is graduated to read changes in inclination preferably in terms of thousandths of an inch per foot. While this may be varied I have shown the dial as graduated to read up to ten thousandths of an inch on either side of its zero reading. The readings are positive if the dial end of my device is high, and negative if that end is low. As shown in the drawings, the centering scale 16 is positioned closely to the dial 24 above the flange 28.

I provide a cover 29 preferably of insulating material detachably held to the bed 4 by screws 30. The cover 29 is slotted as at 31 to permit the vial 11 to be observed and is also provided with a window 32 to permit the dial 24 to be read relative to the centering scale 16, and laterally of the window 32 I mark the cover 29 with plus and minus signs to facilitate the reading of the dial 24. The cover 29 is cut away as at 33 to permit the dial 24 to protrude laterally and is formed with protecting projections 34 exposing the flange 28 for manual engagement.

In order that the operation of my invention may be fully understood, I have shown in Figs. 5-10, views of my invention illustrative of different adjustments in testing the surface S.

Figure 5:
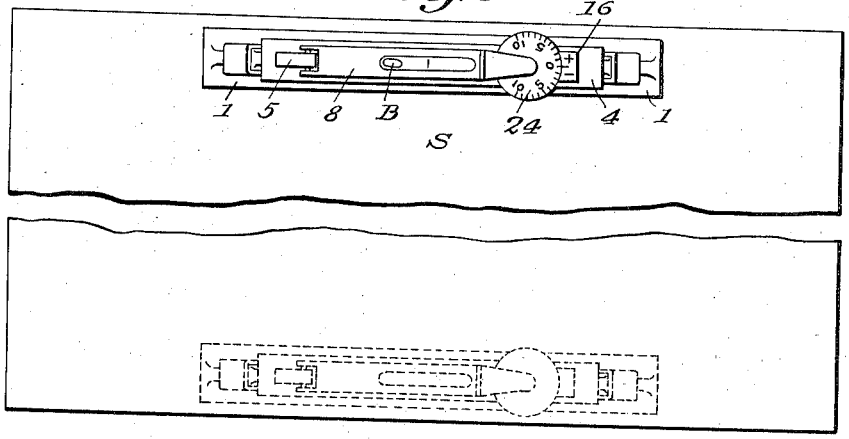
Fig. 5 shows my device in plan view on a surface to be tested.
Figure 6:
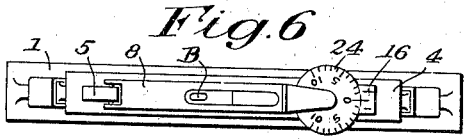
Figs. 6 to 10 are plan views of my device indicating adjustments typical of the use of my invention in testing a surface.
Figure 9:
Figure 7:
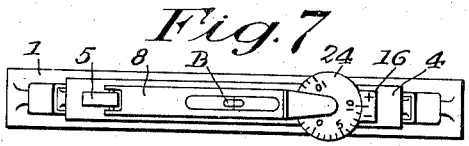
Figure 10:
Figure 8:
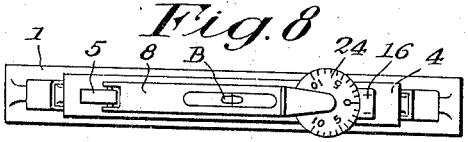

I have shown in Fig. 5 my device initially placed on the surface S to be tested. The position of the dial 24 is not material, but it will be appreciated from the position of the bubble B in the vial 11 that the cradle arm 8 is not level. The handle 21 is rotated to raise or lower the cradle arm 8 until the vial bubble B is centered as shown from a comparison of Figs. 6 and 7. As this may involve several complete rotations of the dial 24, the reading of the dial 24 may not be important. The operator then holds the knob 21 against rotation and slips the dial 24 until it reads zero with reference to the center line indicated by the scale 16, as is shown in Fig. 8. The device is then shifted, for example, to its dotted line position in Fig. 5 on the surface S where the amount of inclination differs as shown by the off-center position of the bubble B in Fig. 9. The handle 21 is again rotated to adjust the cradle arm 8 until the bubble B is again centered and the variation or inclination can then be read directly and recorded. As shown in Fig. 10, the amount of inclination is minus 5 units on the dial 24.

It will be appreciated from the foregoing that my invention permits the variations in inclinations of a surface to be easily and accurately measured. Because the dial 24 is only frictionally carried by the vial adjusting means, the screw 20 may have a relatively long travel so that under a relatively wide range of conditions, the cradle arm 8 may be brought into an initial level position and the dial 24 re-set without disturbing the originally established relation between the cradle arm 8 and the surface, and still permit the device to be re-leveled on other parts of the surface with the variations in inclination measurable in terms, for example, of thousandths of an inch to the foot.

What I therefore claim and desire to secure by Letters Patent is:

1. A precision device for measuring variations in the inclination of surfaces, said device comprising a support having a surface engaging portion, level indicating means pivotally carried by said support, rotatable means carried by said support to adjust said level indicating means, a first member carried by said level indicating means, a second member rotatable with said rotatable means and movable in predetermined relation to said first member during adjustments of said level indicating means, said members having related graduations for measurement of the inclination, and clutch means frictionally connecting said second member to said rotatable means to permit said second member to be rotated independently of said rotatable means.

2. A precision device for measuring variations in the inclination of surfaces, said device comprising a support having a surface contacting portion, an arm pivotally carried by said support, level indicating means on said arm, an internally threaded sleeve carried by said support, rotatable means threaded through said sleeve to engage with said arm to adjust said level indicating means, a first member carried by said arm, a second member, said members having related graduations for measuring the amount of inclination, means connecting said second member to said rotatable means for rotation with or independently of said rotatable means, said connecting means comprising a shoulder on said rotatable means, said second member having an aperture to permit said second member to be freely supported by said shoulder, a spring in engagement with said second member and said rotatable means, and a nut threaded on said rotatable means to compress said spring to engage said second member frictionally with said rotatable means.

3. The device of claim 2 in which said second member is apertured to receive said spring and said nut.

4. A precision device for measuring variations in the inclination of surfaces, said device comprising a support having a surface engaging portion, an arm pivotally connected to said support, a bubble vial carried by said arm, rotatable means carried by said support to pivot said arm, said rotatable means comprising a fixed nut and a screw threaded therein, a circular member having a bottom flange, means frictionally connecting said circular member to said screw so that said circular member may be rotated with or independent of said screw, a second member having an arcuate edge concentric with said circular member, means connecting said second member to said arm to carry said second member above the flange of said circular member adjacent said circular member, and said circular member and said second member having related graduations indicative of the amount of inclination.

5. The device of claim 4 and a cover detachably attached to said support, said cover being apertured to expose said vial, portions of said circular member and said cover being formed with arcuate projections to protect said circular member but exposing the flange of said circular member for manual engagement.

6. A device for use in measuring variations in the inclination of a surface, said device comprising a work contacting base, level indicating means pivotally carried by said base, means carried by said base to adjust said level indicating means, said means including a portion engageable by the operator, a member for measuring the inclination of said surface relative to the adjusted position of said level indicating means, means frictionally connecting said member to said adjusting means so that said member may have a zero reading when said level indicating means are adjusted on an inclined surface, said engageable portion and said member being spaced from each other so that they may simultaneously be separately engaged by the operator in adjusting said member to its zero reading without actuating said adjusting means, said member being adapted to rotate with said adjusting means whenever released by the operator.

7. A device for measuring variations in the inclination of surfaces, said device comprising a support of heat conducting material and having a surface contacting portion, a bed, and a plurality of spaced supports connecting said bed and said portion, two of said supports defining with said bed a centrally disposed hand grip, a spirit level pivotally mounted in said bed, adjustable means carried by said support to adjust said level, heat insulating means carried by said bed intermediate said supports defining said hand grip to insulate said level against the body heat of the operator in handling said device.

8. A precision device for measuring variations in the inclination of surfaces, said device compring a support of heat conducting material and having a surface contacting portion, a bed, and a plurality of spaced supports connecting said bed and said portion, two of said supports defining with said bed a centrally disposed hand grip and two of said supports defining end hand grips, a spirit level pivotally mounted in said bed, adjustable means carried by said support to adjust said level, heat insulating means carried by said bed intermediate said supports defining said hand grips, and heat insulating means carried by said end hand grips, said insulating means being effective to insulate said level against the body heat of the operator in handling said device.

9. A precision device for measuring variations in the inclination of surfaces, said device comprising a support of heat conducting material and having a surface contacting portion, a bed, and a plurality of spaced supports connecting said bed and said portion, two of said supports defining with said bed a centrally disposed hand grip and two of said supports defining end hand grips, a spirit level pivotally mounted in said bed, adjustable means carried by said support to adjust said level indicating means, an indicator member actuated by said adjustable means, said indicator member being adjustable independently of said adjusting means, and heat insulating means carried by said bed intermediate said supports defining said hand grips, and heat insulating means carried by said end hand grips, said heat insulating means being effective to insulate said level against the body heat of the operator in handling said device.

10. A precision device for measuring variations in the inclination of surfaces, said device comprising a support of heat conducting material and having a surface contacting portion, a bed, and a plurality of spaced supports connecting said bed and said portions, two of said supports defining with said bed a centrally disposed hand grip and two of said supports defining end hand grips, a spirit level pivotally mounted in said bed, adjustable means carried by said support to adjust said level indicating means, an indicator member actuated by said adjustable means, said indicator member being adjustable independently of said adjusting means, and heat insulating means carried by said bed to protect said member and said level against the body heat of the operator in handling said device.

11. The device of claim 8 in which the heat insulating means are blocks of heat insulating material attached to said supports and said bed.

12. A device for measuring variations in the inclination of surfaces, said device comprising a support comprising a surface contacting portion, a bed, spaced supports connecting said portion and said bed, a pair of said supports defining with said bed a centrally disposed hand grip and a pair of said supports establishing end hand grips, level indicating means pivotally carried by said bed, and means to adjust said level indicating means, said adjusting means being carried by said support and including a screw including an engageable portion, and a fixed internally threaded member disposed so that said engageable portion is accessibly located intermediate one of said end hand grips and one of said supports defining said centrally disposed hand grip.

13. A device for measuring variations in the inclination of surfaces, said device comprising a support comprising a surface contacting portion, a bed, spaced supports connecting said portion and said bed, a pair of said supports defining with said bed a centrally disposed hand grip, another pair of supports establishing end hand grips, one of said first pair of supports including a boss adjacent one of said end hand grips and defining therewith a recess, level indicating means pivotally carried by said bed, and means to adjust said level indicating means, said adjusting means comprising an internally threaded member extending vertically through said boss and said bed and a screw in said threaded member, said screw including an engageable portion disposed in said recess.

14. A precision device for measuring variations in the inclination of surfaces, said device comprising a support having a surface contacting portion, level indicating means pivotally carried by said support, rotatable means carried by said support to adjust said level indicating means, a member carried by said level indicating means, a second member, said members having related graduations for measurement of the inclination, a shoulder on said rotatable means, said second member being apertured to freely receive said rotatable means and to be freely supported by said shoulder, adjustable means carried by said rotatable means and a spring compressibly interposed between said second member and said adjustable means to frictionally connect said second member to said rotatable means.

15. A precision device for measuring variations in the inclination of surfaces, said device having a surface engaging portion, an arm pivotally connected to said support, a bubble vial carried by said arm, rotatable means carried by said support to pivot said arm, a first member having a center line carried by said arm, a second member having graduations readable with reference to said center line to indicate the amount of inclination, clutch means frictionally connecting said second member to said rotatable means, and a cover detachably secured to said support, said cover being apertured to expose said bubble vial, said center line and the part of said second member adjacent to said center line.

16. A spirit level comprising a support having a horizontal surface contacting portion and having a vertically disposed bearing portion above said surface contacting portion at one end of said support, a horizontally disposed vial-tube pivoted adjacent the other end of said support and having its free end overlying said bearing portion, an arm adjusting member rotatable in said bearing portion and having one end exposed at one side of said bearing portion for manual operation and having its other end exposed at the other side of said bearing portion for contact with the free end of said arm to rock the same on its pivot when said member is rotated in one direction, means yieldingly urging the free end of said arm towards said adjusting member, and indicating means responsive to angular variations between the adjusted arm and the surface being tested, said indicating means comprising a graduated dial mounted on said adjusting member between the free end of said arm and said bearing portion and rotatable with said adjusting member when the same is rotated and rotatable independently of said adjusting member when desired, and a relatively fixed scale member carried by the free end of said arm and having a graduation readable with reference to the graduations of said dial.

17. A spirit level comprising a support having a horizontal surface contacting portion, a vertically disposed bearing portion above said surface contacting portion at one end of said support, a horizontally disposed vial tube carrying arm pivoted adjacent the other end of said support and having its free end overlying said bearing portion, an arm adjusting member rotatable in said bearing portion and having its inner end disposed for engagement with the free end of said arm to rock the same on its pivot whenever said member is rotated in one direction, a relatively fixed scale carried by the free end of said arm, a graduated dial mounted on said adjusting member and readable with reference to said scale, and a clutch connection between said adjusting member and dial for compelling the dial to normally rotate therewith relative to said fixed scale whenever said adjusting member is rotated but permitting the dial to be rotated independent of said adjusting member whenever the adjusting member is positively held against rotation.

18. A device for measuring variations in the inclination of a surface, said device comprising a support having a surface contacting portion, level indicating means pivotally carried by said support, rotatable means carried by said support to adjust said level indicating means, an indicator member for measuring the amount of inclination, and a clutch connecting said indicator member and said rotatable member, said clutch including a spring under sufficient tension to establish a positive connection between said members when the adjusting means is rotated and said indicator member is unrestrained.

19. A device for measuring variations in the inclination of a surface, said device comprising a support having a surface contacting portion, level indicating means pivotally carried by said support, rotatable means carried by said support to adjust said level indicating means, an indicator member for measuring the amount of inclination, and a clutch connecting said indicator member and said rotatable member, said clutch including a spring under sufficient tension to establish a positive connection between said members when said adjusting means is rotated and said indicator member is unrestrained, and means to adjust the tension of said spring.

DAVID W. MANN.